United States Patent
Lepp et al.

(10) Patent No.: US 11,838,855 B2
(45) Date of Patent: Dec. 5, 2023

(54) ADVERTISING SERVICE INFORMATION FOR A SERVICE

(71) Applicant: BlackBerry Limited, Waterloo (CA)

(72) Inventors: James Randolph Winter Lepp, Ottawa (CA); Michael Peter Montemurro, Toronto (CA); Stephen McCann, Southampton (GB)

(73) Assignee: BlackBerry Limited, Waterloo (CA)

( * ) Notice: Subject to any disclaimer, the term of this patent is extended or adjusted under 35 U.S.C. 154(b) by 266 days.

(21) Appl. No.: 16/906,745

(22) Filed: Jun. 19, 2020

(65) Prior Publication Data
US 2021/0400564 A1  Dec. 23, 2021

(51) Int. Cl.
*H04W 12/00* (2021.01)
*H04W 48/10* (2009.01)
*H04W 12/069* (2021.01)

(52) U.S. Cl.
CPC ......... *H04W 48/10* (2013.01); *H04W 12/069* (2021.01)

(58) Field of Classification Search
CPC ..... H04W 48/10; H04W 12/069; H04W 4/50; H04W 72/02; H04W 72/0406; H04W 72/0453; H04W 4/40; H04W 4/44; H04W 28/16; H04L 5/0053; H04L 5/0096
See application file for complete search history.

(56) References Cited

U.S. PATENT DOCUMENTS

| | | | | |
|---|---|---|---|---|
| 11,032,686 | B2 * | 6/2021 | Montemurro | H04W 52/0212 |
| 2017/0311142 | A1 * | 10/2017 | Montemurro | H04W 76/10 |
| 2018/0014232 | A1 * | 1/2018 | Hoehne | H04W 48/18 |
| 2020/0015043 | A1 | 1/2020 | Patil et al. | |
| 2020/0228948 | A1 * | 7/2020 | Watfa | H04W 48/14 |
| 2020/0389869 | A1 * | 12/2020 | Patil | H04B 17/318 |

FOREIGN PATENT DOCUMENTS

| | | | |
|---|---|---|---|
| WO | 2018/227039 A1 | 12/2018 | |
| WO | WO-2019236714 A1 * | 12/2019 | H04W 4/40 |

OTHER PUBLICATIONS

SAE International, Surface Vehicle Standard, J2945™/1, On-Board System Requirements for V2V Safety Communications, Mar. 2016 (127 pages).
IEEE Standard for Wireless Access in Vehicular Environments (WAVE)—Networking Services, IEEE Vehicular Technology Society, IEEE Std 1609.3™—2016 (160 pages).
3GPP TS 23.285 V16.2.0 Technical Specification 3rd Generation Partnership Project; Technical Specification Group Services and System Aspects; Architecture enhancements for V2X services (Release 14) (Dec. 2019) (38 pages).

(Continued)

*Primary Examiner* — Lakeram Jangbahadur
(74) *Attorney, Agent, or Firm* — TROP, PRUNER & HU, P.C.

(57) ABSTRACT

In some examples, a first wireless device transmits, within a first band designated for vehicle-related communications, service information for a service, the service information comprising information of a channel in a second band for communication of data of the service, the second band being outside of the first band.

20 Claims, 7 Drawing Sheets

(56) References Cited

OTHER PUBLICATIONS

IEEE Standards Association, IEEE Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications, IEEE Std 802.11 2016, 3534 pages.

IEEE Standard for Information technology (IEEE Std 802.11p-2010)—Telecommunications and Information Exchange Between Systems Local and Metropolitan Area Networks—Specific Requirements Part 11: Wireless LAN Medium Access Control (MAC) and Physical Layer (PHY) Specifications, Amendment 6: Wireless Access in Vehicular Environments, Jul. 15, 2010 (51 pages).

IEEE P802.11ax™/D2.2, Draft Standard for Information technology—Telecommunications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, Feb. 2018 (620 pages).

U.S. Department of Transportation, Dedicated Short-Range Communications (DSRC) Service, Rule Part 47 C.F.R, Parts 90 and 95, Apr. 22, 2019 (2 pages).

Wikipedia, Generic Advertisement Service last edited Mar. 2, 2015 (2 pages).

Wikipedia, IEEE 802.11u last edited Jul. 7, 2019 (4 pages).

Wikipedia, LI-FI last edited 3 June 020 (11 pages).

Htg7.org/html/servicepackages/sp119.html—Privacy Protection, Harmonized Architecture Reference for Technical Standards downloaded Jun. 1, 2020 (1 page).

T. Berners-Lee et al., Network Working Group, Request for Comments: 3986, STD: 66, Updates: 1738, Obsoletes: 2732, 2396, 1808, Category: Standards Track Adobe Systems, Uniform Resource Identifier (URI): Generic Syntax, Jan. 2005 (61 pages).

Draft ETSI EN 302 890-1 V1.2.0, Intelligent Transport Systems (ITS); Facilities layer function; Part 1: Services Announcement (SA) specification (Apr. 2018) (18 pages).

Draft International Standard, ISO/DIS 22418, Intelligent transport systems—Fast service announcement protocol (FSAP) for general purposes in ITS, 2019 (66 pages).

WiFi Alliance, Device Provisioning Protocol, Specification, Version 1.1, 2018 (166 pages).

IEEE P802.11-REVmd™/D3.0, Draft Standard for Information technology—Telecommunications and information exchange between systems, Local and metropolitan area networks Specific requirements, Part 11: Wireless LAN Medium Access Control (MAC) and Physical Layer (PHY) Specifications, Oct. 2019, pp. 1-2373 (1 of 2).

IEEE P802.11-REVmd™/D3.0, Draft Standard for Information technology—Telecommunications and information exchange between systems, Local and metropolitan area networks—Specific requirements, Part 11: Wireless LAN Medium Access Control (MAC) and Physical Layer (PHY) Specifications, Oct. 2019, pp. 2374-4647 (2 of 2).

3GPP TR 23.786 V16.1.0 3rd Generation Partnership Project; Technical Specification Group Services and System Aspects; Study on architecture enhancements for the Evolved Packet System (EPS) and the 5G System (5GS) to support advanced V2X services (Release 16) (Jun. 2019) (120 pages).

European Patent Office, Extended European Search Report for Appl. No. 21175054.2 dated Sep. 9, 2021 (12 pages).

European Patent Office, Communication pursuant to Article 94(3) EPC for Appl. No. 21175054.2 dated May 5, 2023 (4 pages).

Canadian Patent Office, Office Action for Appl. No. 3,114,984 dated Oct. 16, 2023 (4 pages).

* cited by examiner

ADVERTISING SERVICE INFORMATION FOR A SERVICE

BACKGROUND

Vehicles can be provided with communication components to allow the vehicles to communicate with each other, with a network or other service infrastructure, or with another device. Examples of data that can be transmitted or received by vehicles can include data collected by sensors, traffic information, status information, and so forth. Such data can be referred to as vehicle-related data.

The amount of vehicle-related data can in some cases overload communication resources used for the communications of vehicle-related data.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, communications in a network are governed by Institute of Electrical and Electronic Engineers (IEEE), Wi-Fi® Alliance standards, or European Telecommunications Standards Institute/Third Generation Partnership Project (ETSI/3GPP) standards. Some IEEE standards mentioned in the present disclosure include: IEEE 802.11ax (High Efficient WLAN task group within the IEEE 802.11 project), IEEE 802.11bd (Next Generation V2X—Vehicle to anything—task group within the IEEE 802.11 project), IEEE 802.11md (Revision and maintenance task group within the IEEE 802.11 project). ETSI/3GPP standards include different generations of cellular networks such as second generation (2G) Global System for Mobile/General Packet Radio Service (GSM/GPRS), third generation (3G) Universal Mobile Telecommunications (UMTS), fourth generation (4G) Long Term Evolution (LTE), and fifth generation (5G) New Radio (NR), as well as associated technologies such as PC5 Sidelink and Multimedia Broadcast Multicast Service (MBMS) broadcast channels.

The IEEE 802.11p-2010 amendment (part of the IEEE 802.11-2016 standard) specifies usage of 10 megahertz (MHz) wide channels in the 5.9 gigahertz (GHz) band for a vehicular environment (in which communications occur between vehicles, between vehicles and road side units (RSUs), or between vehicles and other devices). IEEE 802.11p is an extension of IEEE 802.11a, where frames are transmitted in an un-associated state.

Communications in a vehicular environment can be referred to as "vehicle-related communications."

This 5.9 GHz band is an example of a frequency band that is designated for vehicle-related communications (e.g., V2X communications). This frequency band designated for vehicle-related communications can also be referred to as Intelligent Transport System (ITS) band. A frequency band that is designated for vehicle-related communications can refer to a frequency band that is limited generally for use by services that participate in vehicle-related communications. Depending on local regulations, services that do not participate in vehicle-related communications should not use or are not allowed to use the frequency band designated for vehicle-related communications. An example of such a frequency designation is footnote NG160 of the FCC regulation 47 C.F.R. § 2.106.

A "frequency band" is defined as a range of frequencies. In some examples, a frequency band can include a contiguous range of frequencies that starts at a first frequency and ends at a second frequency. In other examples, a frequency band can include multiple non-contiguous ranges of frequencies.

More generally, a "band" can refer to a collection of communication resources (defined by any or some combination of frequency, time, coding, etc.). A band designated for vehicle-related communications refers to a collection of communication resources designated for vehicle-related communications.

V2X is a feature that provides for communication of information from a vehicle to other entities (and possibly also/alternatively vice versa) that may affect the vehicle and/or the other entities. V2X includes one or more of a subset of features, including communication of a vehicle to/from any or some combination of the following: other vehicles (vehicle-to-vehicle or V2V communication); an infrastructure, e.g., RSUs (vehicle-to-infrastructure or V2I communication); a pedestrian (vehicle-to-pedestrian or V2P communication); a network (vehicle-to-network or V2N communication); a device, e.g., an electronic device within the vehicle (vehicle-to-device or V2D communication), an electricity grid (vehicle-to-grid or V2G communication); and so forth.

IEEE 802.11p-compliant devices use a special operation mode referred to as Outside the Context of a BSS (OCB). No authentication/association of a device with a network has to be performed before the device can communicate application data or service data over the network with another device. The only parameter to be configured is a frequency channel (central frequency and bandwidth) to communicate on. The frequency channel (or more simply "channel") is known before hand and is typically assigned as part of the definition of a particular V2X application at a higher layer. Communication is broadcast addressed or unicast addressed. Many V2X applications rely exclusively on the unacknowledged broadcasting mode.

A V2X endpoint device refers to an electronic device that is able to participate in a V2X communication. A V2X endpoint device can include a vehicle, an electronic device (e.g., a desktop computer, a notebook computer, a tablet computer, a smartphone, a wearable device, a game appliance, etc.), an RSU (which refers to any equipment that is provided on a road, on the side of a road, or in proximity to a road, such as for example, a traffic light, an electronic sign, a toll booth, or any other type of structure), a network node in a network, equipment in an electricity grid, and so forth.

1. Issues 1.1 Issue 1

The ITS band (or another frequency band designated for vehicle-related communications) may have a restricted capacity for transmission of information. As an ITS system adds new services that communicate data with possibly large payloads, the channels in the ITS band can become full. In other words, the bandwidth of the channels in the ITS band may become fully utilized such that further communications of information in the ITS band is not possible or may be delayed. A "channel" (or "frequency channel") can refer to a frequency portion of the ITS band. In further examples, a "channel" more generally refers to a communication resource, such as in a radio communication network, that can be used to carry data.

A "service" can refer to an entity (such as a program or a machine) or to a process or thread or any other type of activity.

To account for the restricted capacity of the ITS band, it may be desirable to offload the communication of data by certain services to another band that is outside of the ITS band. In some examples, such a band that is outside of the ITS band can be referred to as a non-ITS band. In further examples, there may be multiple non-ITS bands in which communications of information by certain services may be performed.

A first frequency band is outside a second frequency band if there is no overlap in frequencies between the first frequency band and the second frequency band.

Certain types of vehicle-related communications are considered to be critical, such as information related to safety of vehicles or information that should be communicated within a relatively short amount of time of an event that is associated with the communication of the information. Examples of such critical vehicle-related information include position and trajectory of a vehicle on a road, information about a collision, information about an obstacle in a roadway, information about local road environmental conditions (e.g., ice, floods, wind, sand, wind on a bridge, fog, etc.), information about a road closure, information about an emergency or priority vehicle, information about a failed road signal, and so forth. The communication of such critical vehicle-related information should still occur in the ITS band, or more generally, in a band designated for vehicle-related communications.

Other types of vehicle-related communications can be considered non-critical, such as communications not related to safety or communications where delays in the transmission of information can be tolerated. Examples of non-critical vehicle-related information include traveler information, attraction advertisement, information about congestion, new road layouts, information about traffic accident blackspots, information about cycle lane and road intersections signal and phase information, supplementary information about a critical event, and so forth.

An issue relates how to discover instances where vehicle-related communications of specific services are to occur in a non-ITS band.

1.2 Issue 2

In examples where there are multiple non-ITS bands provided by respective different types of networks, it may also be desirable to match different services to different non-ITS bands depending upon characteristics of the services and how they match up with performances of the respective different types of access networks that provide the respective non-ITS bands. Matching services to non-ITS bands may also relate to energy management for V2X systems. The different types of access networks can include a cellular access network, a Wireless Local Area Network (WLAN) (also referred to as a Wi-Fi® network), and so forth.

1.3 Issue 3

In some cases, certain non-ITS bands are available based on local direct communications between wireless devices that are locally within wireless range (e.g., radio range) of one another. If services are able to communicate over wireless networks that support communications over a large geographical region, then additional security should be implemented to protect such communications.

2 Example Implementations

In the ensuing discussion, reference is made to ITS bands and non-ITS bands in some example implementations.

More generally, techniques or mechanisms according to the present disclosure may be applied to other types of bands, where a band designated for vehicle-related communications ("vehicle-related band") can include a collection of communication resources (defined by any or some combination of frequency, time, coding, etc.) designated for vehicle-related communications. A non-vehicle-related band can include another collection of communication resources that is outside of the band designated for vehicle-related communications. The non-vehicle-related band is not designated for vehicle-related communications, i.e., the non-vehicle-related band is not reserved for use for vehicle-related communications.

2.1 Using the ITS Band to Discover Non-ITS Band Delivered Services

Techniques or mechanisms discussed in this sub-section can be used to address Issues 1 and 2 in Sections 1.1 and 1.2 above.

In accordance with some implementations of the present disclosure, techniques or mechanisms are provided to discover ITS services that have been offloaded from the ITS band (e.g., the 5.9 GHz band) to non-ITS bands (of a WLAN, a cellular network, or another access network), or more generally, to discover vehicle-related services that have been offloaded from a vehicle-related band to one or more non-vehicle-related bands, which can be part of an unlicensed or licensed spectrum.

Note that the ITS band may be part of a wireless communication technology in which V2X endpoint devices are able to communicate directly with one another, without communicating data over a network infrastructure. On the other hand, one or more non-ITS bands are deployed over respective one or more access networks.

An "access network" can refer to a network including network equipment over which an endpoint device is able to obtain connectivity and to communicate with one or more other endpoint devices. An access network can include a wireless access network, such as a cellular access network, a WLAN, and so forth. A cellular access network can include an LTE access network, a 5G access network, or any other type of access network. In other examples, an access network can include a wired network, in which an endpoint device is connected by a wired connection to the network to perform communications.

In cases where both the ITS band and one or more non-ITS bands are employed for vehicle-related communications of IT services, multiple different types of communication technologies may be employed to perform the vehicle-related communications.

Figure 1A:
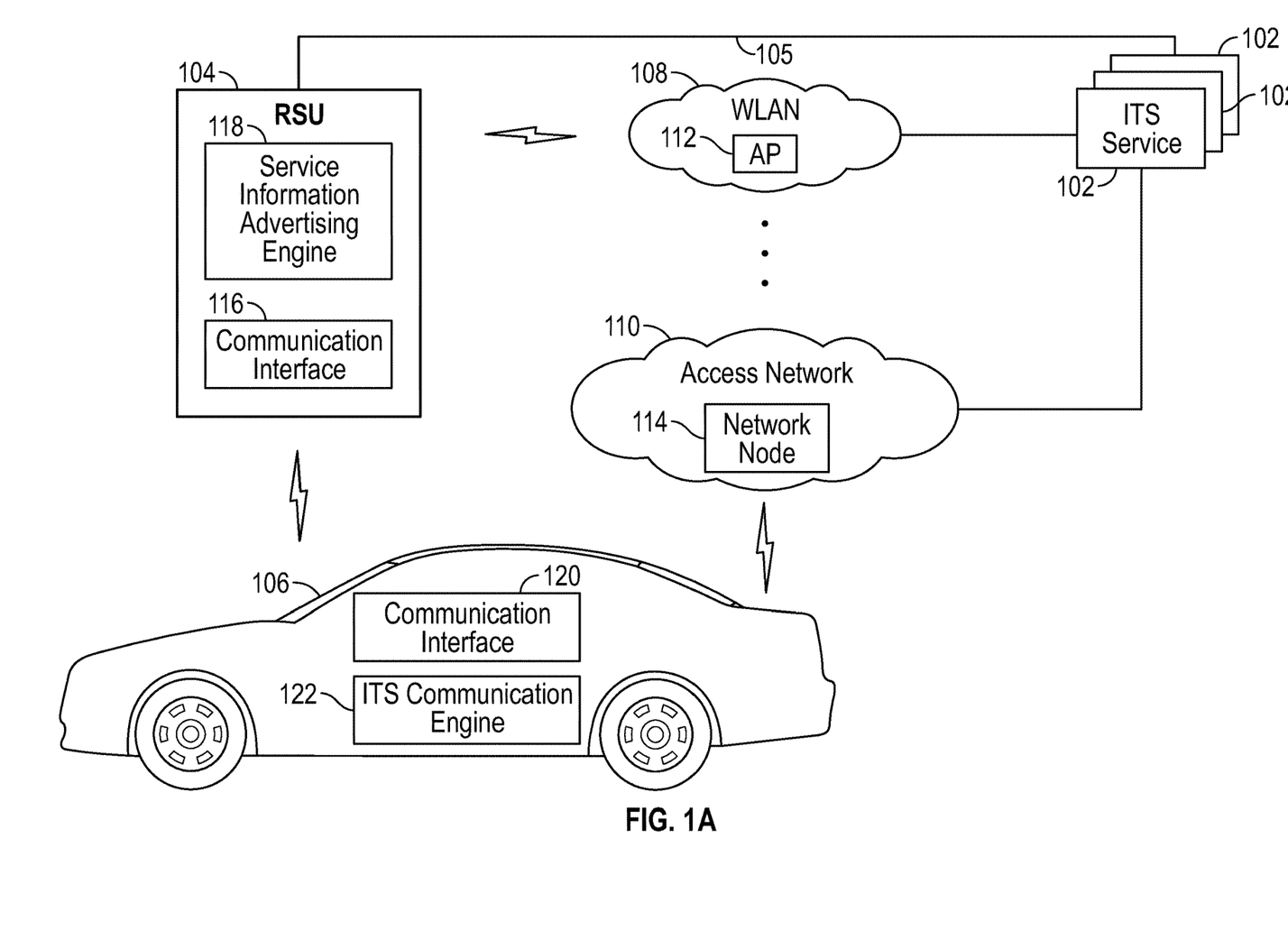
FIG. 1A is a block diagram of an example arrangement including a vehicle, a roadside unit, and access networks, according to some implementations of the present disclosure.

FIG. 1A is a block diagram of an example arrangement that includes one or more ITS services 102, an RSU 104, and a vehicle 106. Although just one RSU and one vehicle are depicted in FIG. 1A, it is noted that in other examples, there can be more than one RSU and/or more than one vehicle.

Although FIG. 1A shows the ITS services 102 as being external of the RSU 104 and the vehicle 106, in other examples, an ITS service 102 may be included in the RSU 104 or in the vehicle 106.

FIG. 1A also shows various different types of access networks, including a WLAN 108, and another access network 110 which can be of a different type than the WLAN 108. For example, the other access network 110 may be a cellular access network.

In some examples, the RSU 104 may communicate with an ITS service 102 over a wired network 105, or alternatively, through the WLAN 108 or the access network 110.

The WLAN 108 includes one or more access points (APs) 112, and the access network 110 includes a one or more network nodes 114. In AP 112 is able to communicate wirelessly with a wireless device, such as the RSU 104 or the vehicle 106. Similarly, the network node 114 is able to communicate wirelessly with a wireless device. If the access network 110 is a cellular access network, then the network node 114 can be referred to as a base station (also referred to as a NodeB, an eNodeB, a 5G base station, etc.).

The RSU 104 includes a communication interface 116 to perform a communication of information. A "communication interface" can include a communication transceiver to transmit and receive signals over a communication link, such as a wireless link. The communication interface can also include one or more protocol layers that govern use of one or more respective protocols for the communication of data.

The RSU 104 further includes a service information advertising engine 118 that is able to advertise service information in an ITS band. As used here, an "engine" can refer to a hardware processing circuit, which can include any or some combination of a microprocessor, a core of a multi-core microprocessor, a microcontroller, a programmable integrated circuit, a programmable gate array, or another hardware processing circuit. Alternatively, an "engine" can refer to a combination of a hardware processing circuit and machine-readable instructions (software and/or firmware) executable on the hardware processing circuit.

Although just one communication interface 116 is shown in the RSU 104, in other examples, the RSU 104 can include more than one communication interface to communicate according to different respective access technologies.

The vehicle 106 also includes a communication interface 120 (or multiple communication interfaces). In addition, the vehicle 106 includes an ITS communication engine 122 to perform vehicle-related communications.

In some examples, the communication interface 116 in the RSU 104 and the communication interface 120 in the vehicle 106 can be used to allow the RSU 104 and the vehicle 106 to communicate directly with one another, without using the network infrastructure of any access network, such as the WLAN 108 and the access network 110, for example. Note that the communication interface 116 in the RSU 104 (or a different communication interface in the RSU 104) can be used to communicate over an access network, such as the WLAN 108 or the access network 110. Similarly, the communication interface 120 in the vehicle 106 (or different communication interface in the vehicle 106) can be used to communicate over an access network.

A direct wireless communication between the RSU 104 and the vehicle 106 can employ any of various different communication technologies, such as Dedicated Short-Range Communications (DSRC) using IEEE 802.11p-2010, LTE-V2X (PC5 interface), light communications (e.g. Li-Fi) link, and any other short range communication technology.

Techniques or mechanisms according to some examples are able to discover ITS services whose communications are provided over non-ITS bands. Generally, the ITS band can operate as an advertising resource that provides information regarding ITS services available in one or more non-ITS bands.

The ITS band can be used to advertise service information for communications of the ITS services 102. In the example of FIG. 1A, the service information advertising engine 118 in the RSU 104 transmits the service information, such as over a direct link from the RSU 104 to the vehicle 106.

In other examples, the service information advertising engine 118 can be included in a different node, other than the RSU 104. For example, the service information advertising engine 118 can be included in another vehicle, a network node such as the AP 112 or the network node 114, or any other device.

The service information can include information of one or more of the following characteristics of an ITS service that is to perform communications in a non-ITS band:

Information of a channel in the non-ITS band, such as radio information. Radio information can identify a band and/or a channel if the service communications has a dedicated channel.

Information indicating a stream characteristic of the ITS service, where examples of stream characteristics can include any or some combination of the following: whether the vehicle-related data is unidirectional or bidirectional, whether the vehicle-related data is unicast or broadcast (multicast), Internet Protocol (IP) information (e.g., an IP address, etc.), a duty cycle of the vehicle-related data (where duty cycle refers to a periodicity at which the vehicle-related data is transmitted), and so forth.

Information that identifies the service, such as a Uniform Resource Identifier (URI) (e.g., a URL that specifies a location in a network of data of the service) or a human readable string for displaying on a user interface (e.g., "accident advisory").

Based on the service information advertised by the service information advertising engine 118, the ITS communication engine 122 in the vehicle 106 can communicate vehicle-related data with an ITS service 102 over a non-ITS band, which can be provided by the WLAN 108 or the access network 110, or both, for example.

In other examples, another endpoint devices can include an ITS communication engine similar to the ITS communication engine 122, where this other endpoint device is also able to receive service information advertised by the service information advertising engine 118, and to perform communication of vehicle-related data with an ITS service 102 over a non-ITS band.

The following describes examples of use cases.

In an example, the vehicle 106 receives (as part of advertised service information from the RSU 104 in a local direct radio transmission) a URL for a web service application programming interface (API) and other information about a given ITS service 102. The ITS communication engine 122 in the vehicle 106 connects to the advertised URL over a cellular Transmission Control Protocol/Internet Protocol (TCP/IP) connection over a cellular network (e.g., 110). The URL refers to the given ITS service 102 provided by a server, which in some examples may be located in a cloud operated by a third party (different from an operator of the cellular network or an operator of the RSU 104). The given ITS service 102 can transmit vehicle-related data through the RSU 104, such as current data about the state of a road infrastructure.

In another example, the vehicle 106 is a taxi queued to pick up passengers at an airport. The vehicle 106 receives (in a local direct radio transmission) service information about a given ITS service 102. The service information may include information of the WLAN 108 used to communicate vehicle-related data of the given ITS service 102. The vehicle 106 connects to the WLAN 108 while queued at the airport and is able to download vehicle-related data from a LAN behind the WLAN AP. In some examples, the vehicle 106 is able to download current information from a local server connected to the LAN, such that no Internet access is employed.

Figure 1B:
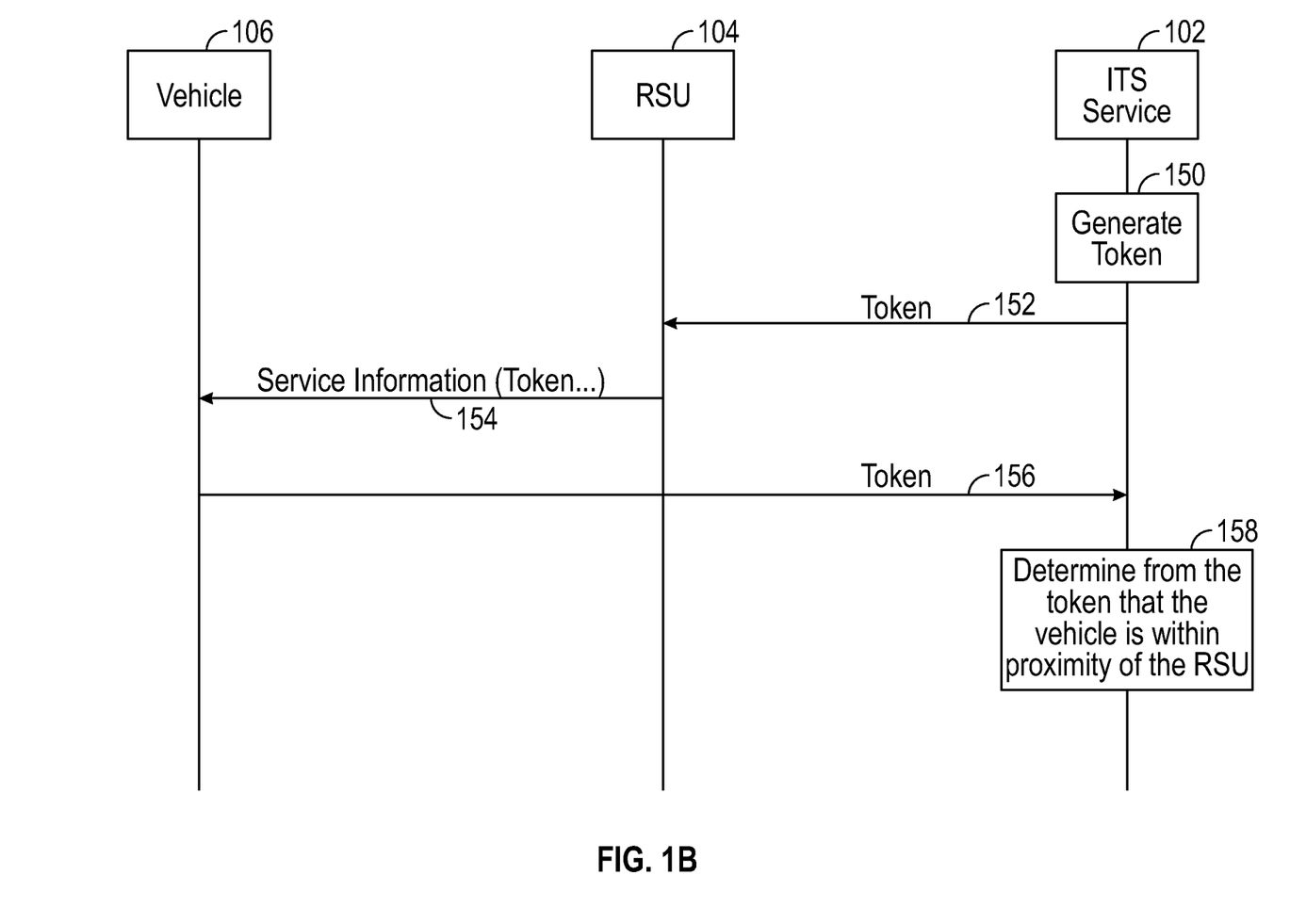
FIG. 1B is a message flow diagram of an example process involving a vehicle, a road side unit (RSU), and an Intelligent Transport System (ITS) service, according to some implementations of the present disclosure.

In another example, as shown in FIG. 1B, the ITS service 102 generates (at 150) a new universally unique identifier (UUID) (which is an example of the requested token, and the ITS service 102 sends (at 152) the token (UUID) to the RSU 104. In response to the vehicle 106 requesting a token from the RSU 104, the RSU 104 sends (at 154) service information including the token (UUID) and a server URL relating to the ITS service 102 to the vehicle 104 over a local direct communication transmission. The vehicle 106 proceeds to access the ITS service 102 at the URL by sending (at 156) to the ITS service 102 over an access network, the UUID as a token. The ITS service 102 determines (at 158) from the token that the vehicle 106 is within proximity of the RSU 104, for authenticating the vehicle 106. The vehicle 106 subsequently receives vehicle-related data of the ITS service 102 over the access network (e.g., the WLAN 108 or the access network 110).

Alternatively, the UUID can be generated at the RSU 104 and provided to the ITS service 102 for use by the ITS service 102 in authenticating the vehicle 106 based on proximity of the vehicle 106 to the RSU 104.

In another example, a given ITS service 102 provides local fuel price information. The given ITS service 102 can be implemented using one or more servers that is (are) part of a cloud. The server(s) provide local fuel price information in different communities across the globe. Within a local community an RSU (e.g., the RSU 104) transmits a specific URL or token that allows the vehicle 106 to download the correct local fuel information from the server(s). For example, a vehicle driving in Ottawa will access the Ottawa fuel prices and not the Vancouver fuel prices.

The following further sub-sections describe more specific mechanisms or techniques for advertising service information for communications of ITS services in non-ITS bands.

2.1.1 Using the ITS Band as a Pilot Channel (WSA Messages)

In some examples, a Wireless Access in Vehicular Environments (WAVE) Service Advertisement (WSA) message can be used to provide information about a non-ITS band service. WSA messages are defined according to IEEE 1609.2.

IEEE 1609.2 WSA messages can be adapted to carry information about an available ITS service. The service information for the ITS service can include the following, as examples: channel number/band in license-exempt spectrum in which the receiver technology is a Wi-Fi® technology, or a URI/URL where the ITS service can be connected to using TCP/IP networking protocols (e.g., a cloud ITS service). This enables the WSA to advertise a service delivered in license-exempt spectrum, by a variety of radio technologies, as well as higher layer networking/internetworking technologies.

IEEE 1609.2-2016 Section 8.2 describes the WSA frame. Changes and updates proposed to the IEEE 1609.2-2016 standard, at a high level, include (further details are provided further below in 3.1):

Increment WSA version.
Allow variable length Service Info Segment.
Allow variable length Channel Info Segment.
Allow multiple Channel Info Segments per Service Info Segment such that a service can be advertised to be available by more than one method (e.g., a DSRC channel number and a URI).
Potentially rename the Channel Info Segment to Service Access Segment.
Channel Info Segment can contain either an IEEE 802.11 channel number/operating class, a URI, a 3GPP UMTS Terrestrial Radio Access (UTRA) Absolute RF Channel Number UARFCN, an IP address, etc. Some more fields are listed in 2.1.4.
Technology type such as Wi-Fi®, Bluetooth®, 4G, 5G, etc.

A WSA message can include radio channel information, credentials for an access network such as a WLAN, service access information such as a service URL, and credential tokens to access the service.

2.1.2 Using ITS Band as a Pilot Channel (Discovery Messages)

In other examples, discovery messages can be used to advertise non-ITS band services. Examples of discovery messages include an Access Network Query Protocol (ANQP) message, a Generic Advertisement Service (GAS) message, and so forth. A wireless device (e.g., the vehicle 106) can exchange ANQP and GAS messages with another device (e.g., the RSU 104) without the wireless device having to first perform authentication and/or association with the other device.

ANQP is a query and response advertisement protocol that is used by a wireless device to discover a range of information about a wireless access network. GAS provides the Layer 2 transport for an advertisement protocol's frames between peer wireless devices prior to authentication.

Examples of information that can be advertised in a discovery message include a Wi-Fi® channel, a URI, and so forth, associated with vehicle-related data that is transmitted over a non-ITS band. The discovery message can include an ANQP reply that is transmitted in response to an ANQP query issued by a wireless device (e.g., the vehicle 106) to another device (e.g., the RSU 104). Changes can be made to ANQP to ensure that it can operate either between a wireless device and an RSU, or alternatively between two wireless devices. As another example, the discovery message can include a GAS reply that is transmitted in response to a GAS query issued by a wireless device (e.g., the vehicle 106) to another device (e.g., the RSU 104).

In other examples, instead of using a query/response technique, the advertisement of service information can be sent using a periodic frame (that is sent periodically).

A new WSMP frame (IEEE 1609) is created to encapsulate all the existing GAS responses (defined for IEEE 802.11) operating with various advertisement protocols. The advertisement protocols include ANQP, Registered Location Query Protocol (RLQP), and Pre-Association Discovery (PAD) (11$aq$) payloads. Enhancements can be made to an advertisement protocol such as PAD to ensure that PAD can operate in a peer-to-peer mode and not be reliant on a network infrastructure or a server located in the network infrastructure. In the case of RLQP and PAD, servers would be located within or be connected to the peer wireless device.

2.1.3 Using the ITS Band as a Pilot Channel (Broadcast Public Action Frames)

In further examples, a broadcast public action frame is used to transmit WSAs (or WSA-type information) in an IEEE 802.11 channel (e.g., a 5.9 GHz ITS channel). This can be a broadcast service information frame, which can be defined in IEEE 802.11bc (modified).

2.1.4 Advertised Fields

The following fields can be included in the enhanced service advertisement methods described in Sections 2.1.1, 2.1.2, and 2.1.3.

Channel number, e.g., an IEEE 802.11 channel number, such as the channel number in an ITS band.

Channel width, e.g., 10, 20, 40, 80, 160 megahertz (MHz).

Service Set Identifier (SSID) for a WLAN (e.g., to identify a local WLAN).

Wi-Fi® Alliance Wi-Fi URI (which can be a credential for a WLAN using the Device Provisioning Protocol (DPP).

URL (e.g., location information of a web service).

URI.

Provider Service Identifier (PSID) (also referred to as an Application Identifier (AID)).

Service Name, which is a string to identify an ITS service.

Service Hash, which is a numerical value produced by applying a hash function on a name of an ITS service.

Service Type, which is a numerical value to identify a type of an ITS service.

Service Subtype, which is a numerical value to identify a type of an ITS service.

Mobile Network Code (MNC), Mobile Country Code (MCC), Public Land

Mobile Network (PLMN), where this combination can identify a cellular network.

UARFCN, which is a frequency number of a cellular network.

In some examples, a channel number, channel width, and UARFCN are used by a receiving device to tune to another radio channel (possibly the same radio technology or a different radio technology) to receive vehicle-related data of the ITS service on that radio channel.

In some examples, a URL and a URI are used by the receiving device to connect to an ITS service over-the-top. Over the top means via an internetworking protocol on a wireless access network such as cellular network or a WLAN.

In some examples, a PSID indicates the particular ITS service being advertised. In many protocols, a PSID is an index number in a header indicating which upper layer application should handle decoding the contained packet. In the case of service advertisements, the PSID received is used to match a list of applications the receiving device is interested in receiving or has subscribed to. The receiving device uses the PSID to determine whether to access the advertised service or not.

In further examples, a Service Name, a Service Hash, a Service Type and/or a Service Subtype can be used instead of or in addition to a PSID.

A WLAN SSID, a Wi-Fi URI, and a PLMN are to provide information about an access network. The information about the access network may be accompanied in the same discovery message as the URL or URL information of the server at which the service is accessed. Providing both the information of the access network and the location on the network allows the service to be offered privately on the access network as opposed to the service being publicly accessible on the Internet. For example, the URI can refer to a server on a specific LAN/WLAN, or the URI can point to a Service Capability Exposure Function (SCEF) or a V2X Control Function (VCF) in a 3GPP network.

2.1.5 WSA Encoded in a URI/URL

The WSA can be constructed in the form of a URI to encode this information of the WSA. The WSA payload can include a URI formatted as an IP URI or a WSA URI.

In a case where the service may be offered over a specific radio technology through IP connectivity, the service advertisement can include a WSA svc URI followed by a URL.

2.1.6 Authenticity of Service Advertisement

If a WSMP message is used to carry the enhanced service advertisement payload, the entire message can be signed to convey its authenticity to the receiving device. If another packet format is used a signature can be used to sign either the content of the service advertisement specifically, or the whole message in its entirety.

Figure 2A:
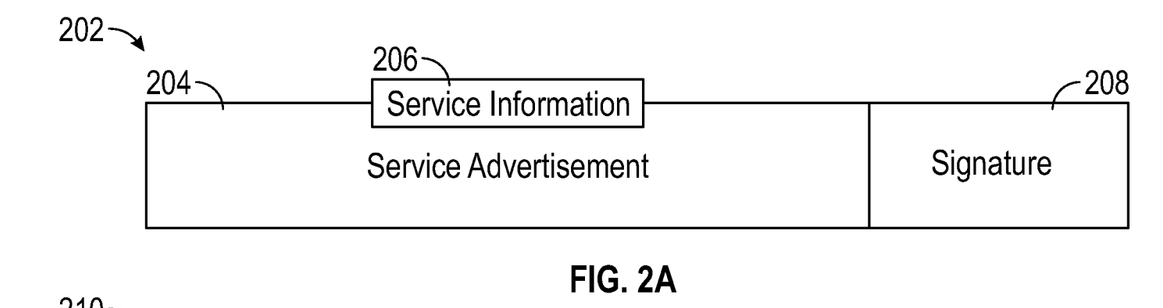
FIGS. 2A-2C illustrate example packets containing service advertisements according to some implementations of the present disclosure.

FIG. 2A shows an example packet 202 carrying a service advertisement 204 that is signed at the packet level. A "packet" refers to a unit of data that has a format specified by a protocol, for example. The service advertisement 204 includes service information 206 about an ITS service (such as any of the example service information discussed further above). In other examples, the service advertisement 204 can include multiple service information 206 about multiple ITS services.

The digital signature 208 is included in or attached to the packet 202, where the digital signature 208 is derived by signing the content of the packet 202, such as by using a cryptographic key.

Figure 2B:
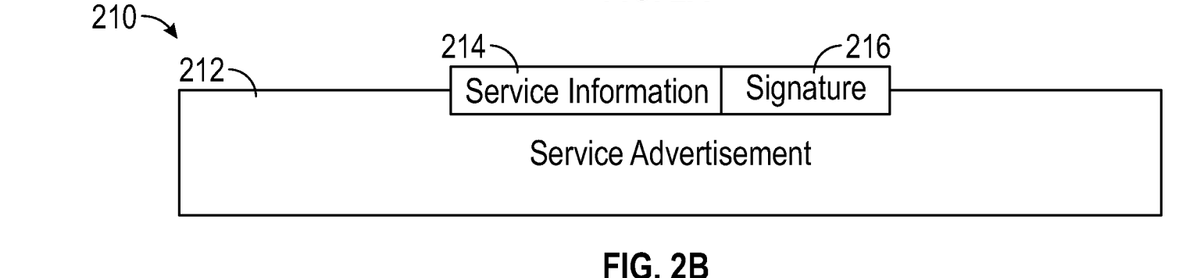

FIG. 2B shows another example packet 210 that includes a service advertisement 212. The service advertisement 212 includes service information 214 about an ITS service.

In FIG. 2B, the service information 214 is signed individually, rather than signing the entire packet 202 as shown in FIG. 2A. Accordingly, a signature 216 is produced based on signing the service information 214, and the signature 216 is included in the packet 210.

Figure 2C:
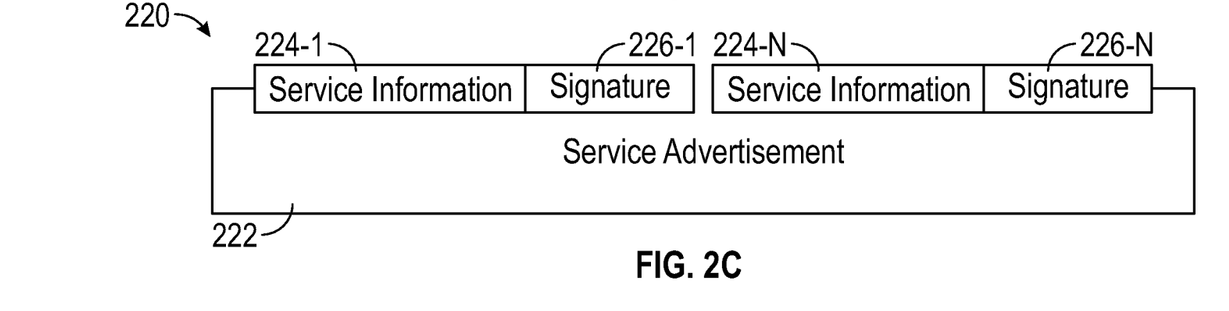

FIG. 2C shows another example packet 220 that includes a service advertisement 222. The service advertisement 222 includes multiple service information 224-1 to 224-N (N≥2) about respective multiple ITS services.

In FIG. 2C, each service information 224-$i$ (i=1 to N) is signed individually. Accordingly, a signature 226-$i$ (i=1 to N) is produced based on signing the service information 224-$i$. The signatures 226-1 to 226-N are included in the packet 220.

FIG. 2C allows multiple service information about multiple ITS services to be sent in one message, where the multiple service information may be potentially signed by different sources.

For example, the RSU 104 at the intersection of a state freeway and a city road may advertise services signed by two different government agencies (a state agency and a city agency). The different signatures validate the different sources of the information providers, even though they are transmitted in the same WSA frame (more generally, packet). The service information being signed may come from different backend networks (e.g., LAN, WAN, Internet, etc.) into the RSU 104.

Signatures may be produced using any of various different cryptographic algorithms. The different cryptographic algorithms can provide different levels of security based on a number of bits or other parameters of a cryptographic algorithm. Traveler information from a first source may have a different level of cryptographic protection than emergency information from a second source. Both can be transmitted from the same RSU 104.

2.2 ITS Band Message Used as a Location/Proximity Verification Token

Techniques or mechanisms discussed in this sub-section can be used to address Issue 3 in Section 1.3 above.

As noted above, a direct wireless communication can be performed between the RSU 104 and the vehicle 106. This is direct wireless communication is a short-range communication, where the RSU 104 and the vehicle 106 are able to communicate with one another directly if the vehicle 106 is within a specified distance of the RSU 104. The specified distance can be a relatively short distance, such as less than 500 meters (m), or less than 250 m, or less than 100 m, or less than 50 m, as examples.

A message, such as an advertisement including one or more service information of respective one or more ITS services, communicated using the direct wireless communication can be referred to as a "short-range message." The short-range message can include a WSA message or a different type of message, as discussed in the present disclosure according to some examples.

In some examples, a short-range message (such as sent by the RSU 104 to the vehicle 106 over a direct wireless communication) can be used as a proximity verification for delivery of vehicle-related data of an ITS service using a server. The delivery of the vehicle-related data using the server can be based on use of a REpresentational State Transfer (REST) application programming interface (API), a URL/URI, a Message Queueing Telemetry Transport (MQTT), a Constrained Application Protocol (CoAP), an Active Message Queuing Protocol (AMQP), or another mechanism.

The vehicle 106 (or another receiving device of the short-range message) is verified to be at a particular geolocation based on the exchange of messages in the direct wireless communication, such as a DSRC communication, a 3GPP PC5 sidelink communication, and so forth. A "geolocation" refers to a geographic position.

In some examples, the vehicle 106 receives a broadcast short-lived token, such as in a WSA message transmitted in the ITS band. In other examples, a local cryptographic challenge/exchange is made on the local direct radio link. Messages can be transmitted in the ITS band to verify proximity or location of the vehicle 106.

The token itself can be embedded in a URL path or URI. Embedding the token in a URL or URI can be used in a local direct radio link that is unacknowledged and unidirectional. The token is passed (such as from the RSU 104 to the vehicle 106 or from a transmitting vehicle to a receiving vehicle) over the local direct link radio link. In some examples, the token is validated by connections through an access network (e.g., the WLAN 108 or the access network 110) to a central server by both devices (e.g., two vehicles, or an RSU and a vehicle)

In alternative examples, the token can be transmitted as part of a bidirectional exchange (such as between the RSU 104 and the vehicle 106 or between vehicles) in the ITS band. The bidirectional exchange can be part of a cryptographic challenge, for example. After the token is transmitted from a transmitting device to a receiving device, a user-specific token or voucher can provided to the receiving device (e.g., the vehicle 106). In this case the local direct radio link is bidirectional and data is acknowledged and validated locally. Upon successful validation locally over the direct radio link, an ITS service is conditionally obtained from a central server over an access network.

Once the receiving device (e.g., the vehicle 106) obtains the token or voucher (using any technique discussed above), the token is used over an access network (e.g., 108 or 110) to access the ITS service (see FIG. 1B discussed above).

In some examples, the token or voucher can be any of the following:
  part of a URI path;
  a variable in a Hypertext Transfer Protocol (HTTP) POST/GET request;
  part of a credential for a Transport Layer Security (TLS) connection;
  an access credential for associating with a WLAN;
  part of a higher layer exchange protocol (e.g., Bootstrapping Remote Secure Key Infrastructures (BRSKI));
  a Public Key Infrastructure (PKI) certificate; or
  a temporal UUID.

Tokens are chosen from a namespace or number space sufficient to prevent collisions for a particular target ITS service. This assures that with a medium level of security (for the broadcast token case) and a high level of security (for the local cryptographic challenge), the entity requesting a service over a network (e.g., the Internet or another unsecured network) indeed was/is present at a specific geolocation (or geographic region).

In some examples, the token may be signed for authenticity or encrypted for confidentiality.

In some examples, the token may contain information about the scope of the token's validity. Scope can be any of many things, with the following two examples provided. Scope can be a time during which the token remains valid. Scope can be a geolocation or geolocations within which the token is valid. Information of the scope may be contained in the token itself, or information of the scope can be stored by a server or service that maps a token to a scope the token represents.

In some examples, a security monitoring function at the server or service or an access control gateway to the server or service can monitor for misuse or abuse of tokens to access a service. This can be used to prevent fraudulent access requests and also to detect and prevent denial of service attacks.

3.1 Further Details of WSA Format

There is a version number in the header of a WSA message. IEEE 1609.3-2016 Section 8.2.2.2 has defined Version 3. A proposal according to some implementations of the present disclosure is for a later version which will be numbered 4 or higher.

Figure 2D:
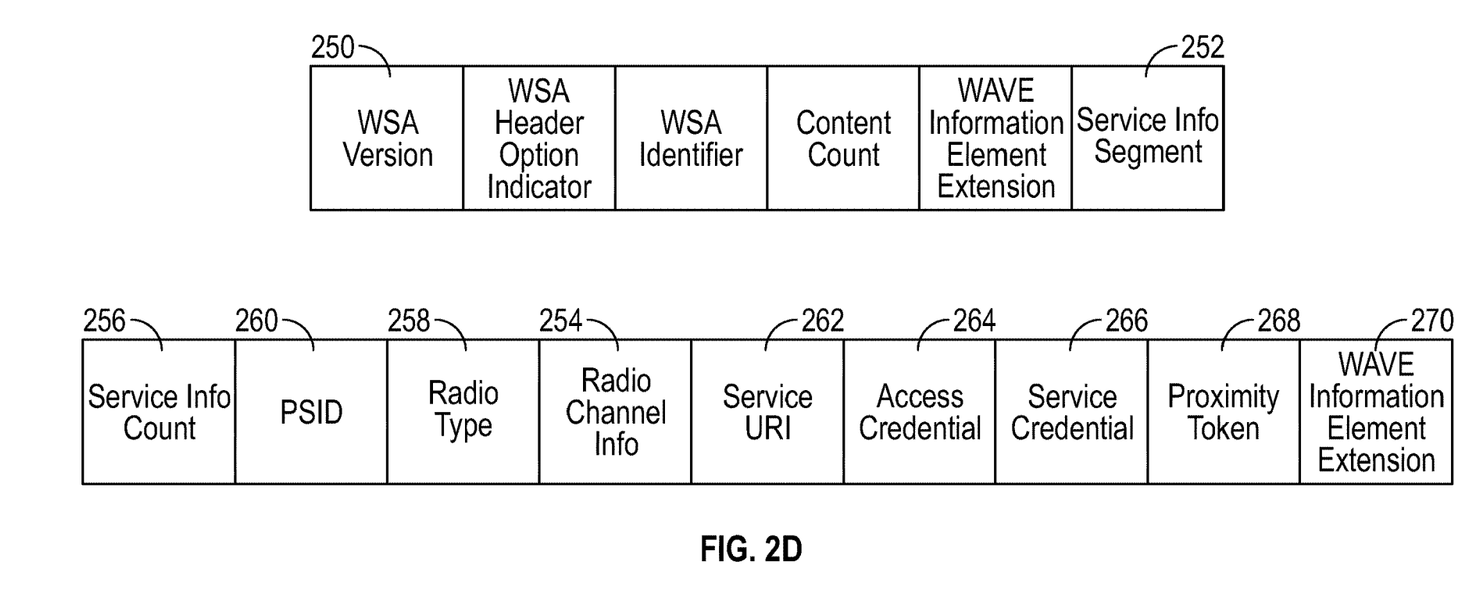
FIG. 2D illustrates an example format of a new Wireless Access in Vehicular Environments (WAVE) Service Advertisement (WSA), according to some examples of the present disclosure.

An updated WSA frame format is shown in the top line of FIG. 2D.

A new WSA version may be reflected in a field 250.

A Service Info Segment 252 can have a variable length. The detailed content of the Service Info Segment 252 is shown in the second line of FIG. 2D. There may be more than one Service Info Segment 252 in a single WSA.

A Radio Channel Info Segment 254 can have a variable length.

Multiple Channel Info Segments per Service Info Segment 252 are allowed, and a field 256 specifies a number of the Channel Info Segments.

A field 258 specifies a technology type, such as Wi-Fi®, Bluetooth®, 4G, 5G, etc.

A field 260 includes a PSID, a field 262 includes a service URI, a field 264 includes an access credential to access an access network, a field 266 includes a service credential to allow access of a service, a field 268 includes a proximity token as discussed further above, and a field 270 includes a WAVE Information Element Extension.

The other fields not labelled in FIG. 2D are existing fields as defined by the WSA protocol.

A new WSA service instance (an instance of an ITS service that supports WSA) according to some implementations of the present disclosure can satisfy any or some combination of the following, in some examples:

- A WSA service instance can be primarily identified by a PSID (e.g., a list of service info instances and PSID is the primary key). The identification of a WSA service instance may be expanded to use other non-PSID identifiers such as a domain name notation or a fully qualified domain name (FQDN).
- There is an option for a service to be referred to by a URI/URL. A URI or URL allows a receiving device to make a TCP/HTTP connection to access the URI or URL over an access network.
- There may be an option to invoke an ISO 21177 TLS connection to a server.
- A WSA service instance can enable a REST API to a URI, but give the receiving device some authentication bits to use for a two-way authenticated TLS connection.
- The WSA may contain more than one instances using the same PSID. This may be used to communicate to the receiver the availability of the service via more than one access network or access technology type. For example the Signal Phase and Timing for an intersection may be provided via direct short range communication on a DSRC channel and C-V2X channel as well as available over the Internet to be downloaded from a server.

3.2 WSA URI

A WSA URI provides information about ITS services. An example WSA URI is provided below.

wsa-service-instance="wsa-svc:"[channel-list ";"] [service-info ";"] [radio-technology ";"] [tech ";"] [service-type ";"] [psid]";;"
pkex-bootstrap-info=[information]
channel-list="C:" class-and-channels*("," class-and-channels)
class-and-channels=class "I" channel*("," channel)
class=1*3DIGIT
channel=1*3DIGIT
service-info="S:" *(%x20-3A/%x3C-7E); semicolon not allowed
radio-technology="R:" tech*("," tech)
tech="WiFi", "Cell", "Wave"
service-type="PSID", "URL", "URI";
psid=*DIGIT The service-type parameter in the example WSA URI indicates the type of service. If the service-type is equal to "URL" or "URI", a URL or URI will follow the WSA URI in the frame.

3.3 Processes of a Receiving Device

Figure 3:
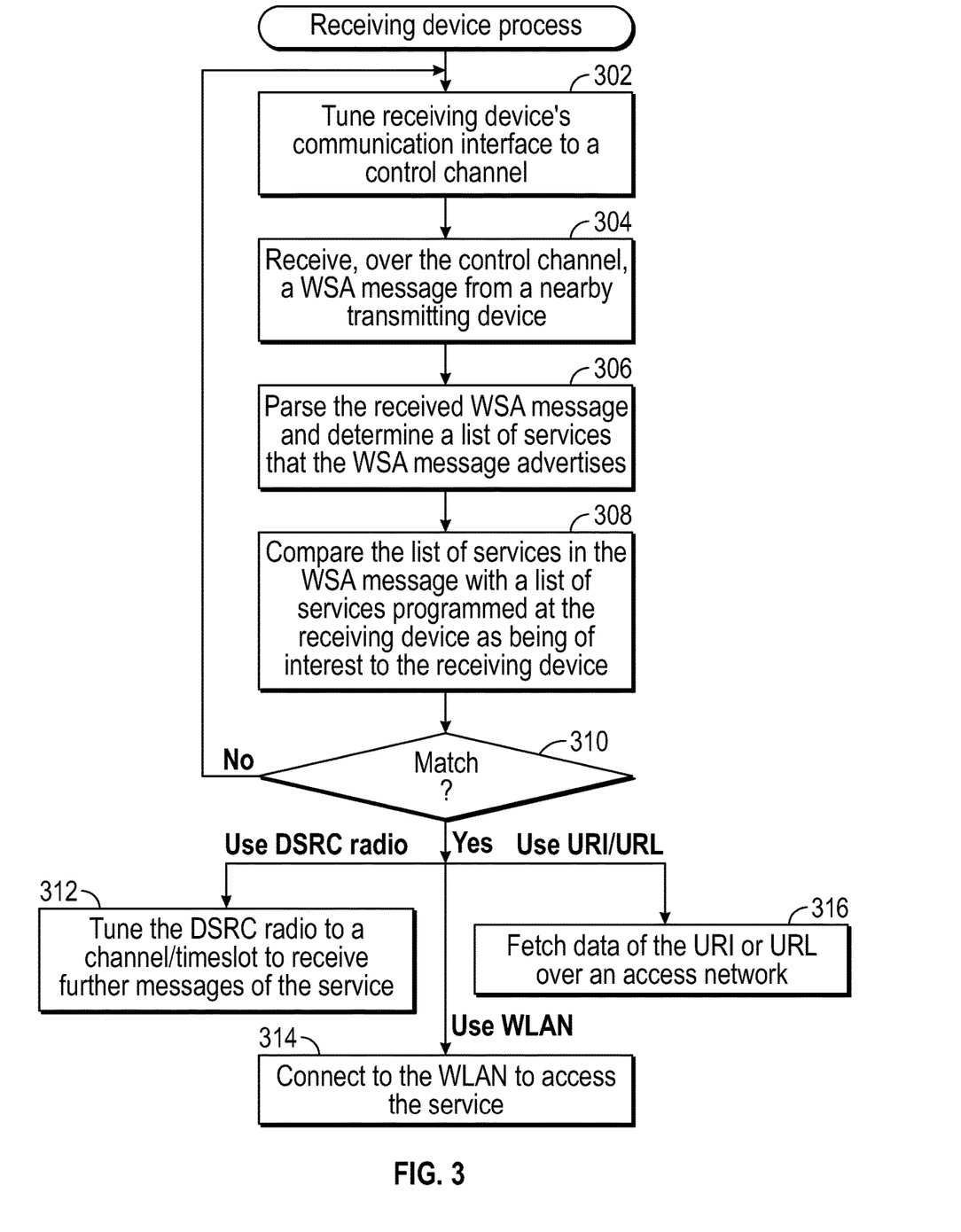
FIGS. 3 and 4 are flow diagrams of example processes of a receiving device, according to some implementations of the present disclosure.

FIG. 3 is a flow diagram of a process performed by a receiving device (e.g., the vehicle 106 of FIG. 1A) according to some examples.

The receiving device tunes (at 302) its communication interface (e.g., a radio in the communication interface) to a control channel, which can be any of the following: IEEE 802.11p channel 180 (a DSRC channel), LTE-V2X channel 183 (a PC5 sidelink), and so forth.

The receiving device receives (at 304), over the control channel, a WSA message from a nearby transmitting device (e.g., the RSU 104 of FIG. 1A, another vehicle, or another device).

The receiving device parses (at 306) the received WSA message and determines a list of services (e.g., ITS services) that the WSA message advertises. A "list of services" can identify one service or multiple services.

The receiving device compares (at 308) the list of services in the WSA message with a list of services programmed at the receiving device as being of interest to the receiving device. If the receiving device determines (at 310) there is a match between the list of services in the WSA message and the list of services programmed at the receiving device, the receiving device proceeds to access the service, using any of the following: (1) if the service is to be accessed using a DSRC radio, the receiving device tunes (at 312) to the DSRC radio to a channel/timeslot to receive further messages of the service, (2) if the service is to be accessed over a WLAN, the receiving device connects (at 314) to the WLAN to access the service, or (3) if the service is to be accessed using a URI or URL, the receiving device fetches (at 316) data at the URI or URL for the service over an access network, such as a cellular network.

Figure 4:
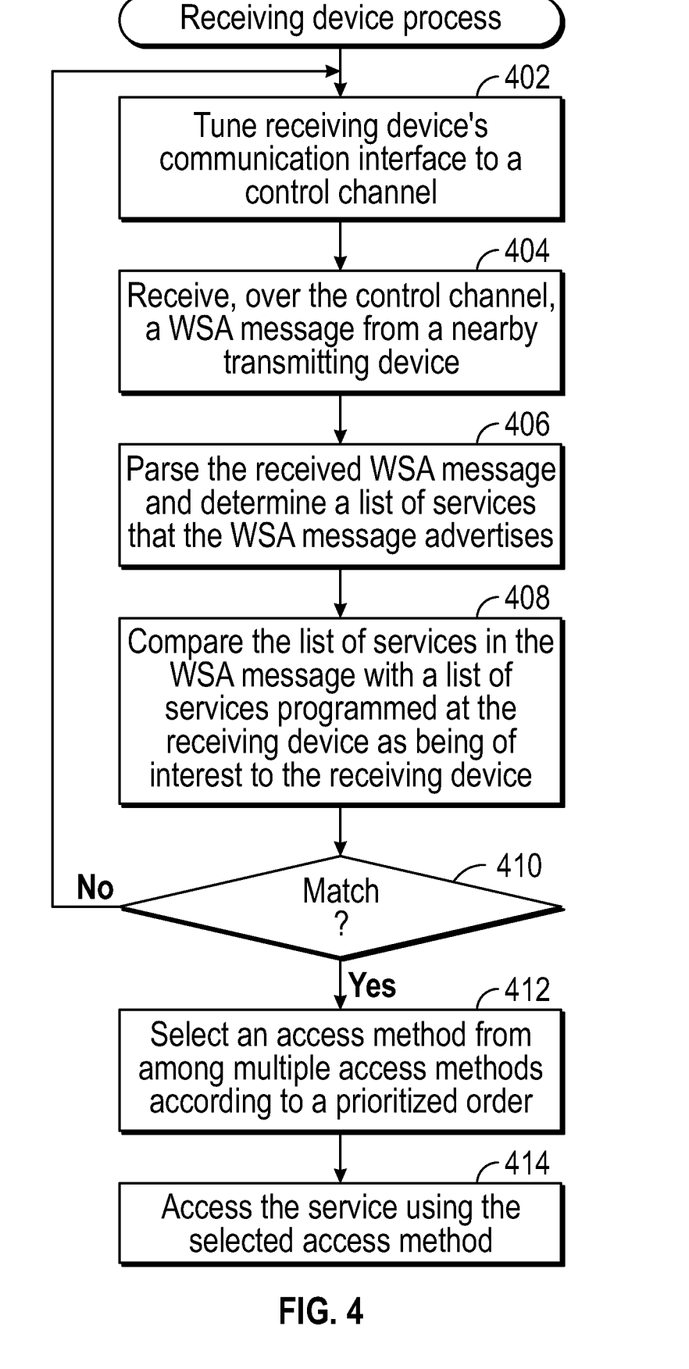

FIG. 4 is a flow diagram of a process performed by a receiving device (e.g., the vehicle 106 of FIG. 1A) according to further examples.

The receiving device tunes (at 402) its communication interface (e.g., a radio in the communication interface) to a control channel, which can be any of the following: IEEE 802.11p channel 180 (a DSRC channel), LTE-V2X channel 183 (a PC5 Sidelink), and so forth.

The receiving device receives (at 404), over the control channel, a WSA message from a nearby transmitting device (e.g., the RSU 104 of FIG. 1A, another vehicle, or another device).

The receiving device parses (at 406) the received WSA message and determines a list of services (e.g., ITS services) that the WSA message advertises.

The receiving device compares (at 408) the list of services in the WSA message with a list of services programmed at the receiving device as being of interest to the receiving device. If the receiving device determines (at 410) there is a match between the list of services in the WSA message and the list of services programmed at the receiving device, the receiving device performs the following.

A service advertised in the WSA may have more than one access method (e.g., a Signal Phase and Timing (SPAT) message on a DSRC channel or via a web API). In that case the receiving device has a prioritized order in which the receiving device decides which method to use to access the service. The receiving device selects (at 412) an access method from among the multiple access methods according to the prioritized order. The receiving device then accesses (at 414) the service using the selected access method.

4 Example Device Arrangement

Figure 5:
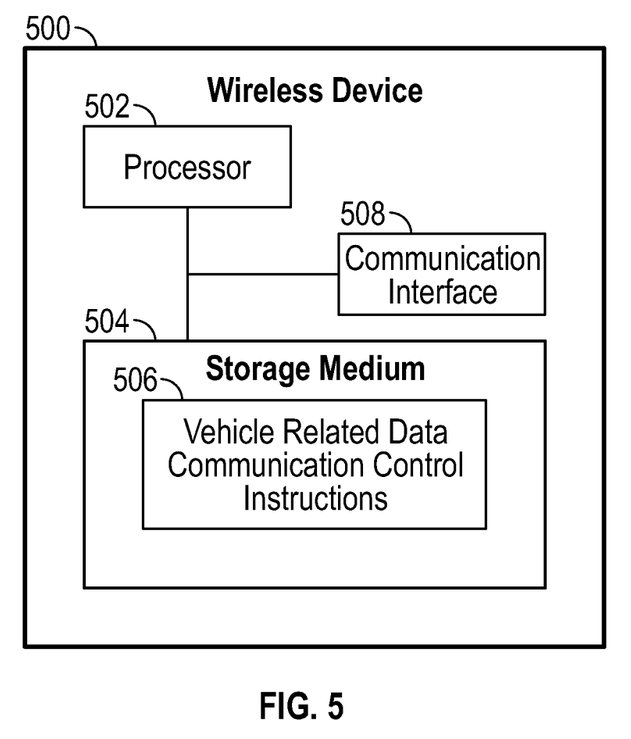
FIG. 5 is a block diagram of a wireless device according to some implementations of the present disclosure.

FIG. 5 is a block diagram of a wireless device 500 (e.g., the RSU 104 or vehicle 106 of FIG. 1A, or another wireless device). The wireless device 500 can perform any of the tasks discussed herein.

The wireless device 500 includes a hardware processor 502 (or multiple hardware processors). A hardware processor can include a microprocessor, a core of a multi-core microprocessor, a microcontroller, a programmable integrated circuit, a programmable gate array, or another hardware processing circuit.

The wireless device 500 includes a communication interface 508 to perform communications over a wireless network.

The wireless device 500 further includes a non-transitory machine-readable or computer-readable storage medium 504 that stores machine-readable instructions executable on the one or more hardware processors 502 to perform various tasks.

The machine-readable instructions include vehicle-related data communication control instructions 506 that are executable on the one or more hardware processors 502. The vehicle-related data communication control instructions 506 can perform tasks of the service information advertising engine 118 in the RSU 104 of FIG. 1A, or can perform tasks of the ITS communication engine 122 in the vehicle 106 of FIG. 1A, or can perform any of the other tasks described in the present disclosure.

For example, the vehicle-related data communication control instructions 506 can be part of the RSU 104 and can cause transmission, within a first band designated for vehicle-related communications (e.g., an ITS band), of service information for a service, the service information including information of a channel in a second band (e.g., a non-ITS band) for communication of data of the service, the second band being outside of the first band.

In further examples, the service information further can include information indicating a stream characteristic of the communication of data of the service, and/or information relating to an identification or location of the service (e.g., a URI, a URL, a PSID, a service name, a service hash, a service type or subtype, etc.).

In some examples, the service information is transmitted by the wireless device 500 to a second wireless device, and the service information is included in a message prior to association of the second wireless device with the wireless device 500.

In some examples, a first type of access network (e.g., DSRC link, PC5 sidelink, etc.) that supports the first band is different from a second type of access network (e.g., a WLAN, a cellular access network, etc.) that supports the second band.

In some examples, the wireless device 500 sends a token to a second wireless device, where the token is useable by the second wireless device in securely accessing the service.

For example, the token is sent to the second wireless device while the second wireless device is in a proximity of and communicating over a local wireless medium with the wireless device 500, and where the access of the service by the second wireless device occurs over an access network that is separate from the local wireless medium.

In some examples, the token provides an indication that the second wireless device was within a specified geolocation of the wireless device 500 at a time the second wireless device received the token.

In other examples, the vehicle-related data communication control instructions 506 can be part of the vehicle 106, and can cause the wireless device 500 to receive, from a second wireless device within a first band designated for vehicle-related communications, service information for a service. The vehicle-related data communication control instructions 506 cause the wireless device 500 to access the service using a channel in the second band advertised by the service information.

In some examples, the service information contains information for a plurality of services, and the vehicle-related data communication control instructions 506 cause the wireless device 500 to compare the plurality of services to information of one or more services stored at the wireless device 500, and identify the service that is to be accessed based on the comparison.

In some examples, the service information indicates a plurality of different access techniques for accessing the service, and the vehicle-related data communication control instructions 506 cause the wireless device 500 to select, to use in accessing the service, an access technique from the plurality of different access techniques.

In some examples, the vehicle-related data communication control instructions 506 cause the wireless device 500 to confirm an authenticity of the service information based on signing of the service information represented by a signature.

In some examples, the wireless device 500 receives, from a second wireless device, a token while the wireless device 500 is in a proximity of the second wireless device, the token communicated over a local wireless medium, and the wireless device 500 accesses the service over an access network that is separate from the local wireless medium.

Techniques or mechanisms according to some implementations of the present disclosure may provide one or more of the following benefits: allow for more efficient use of the capacity of the ITS band, provide more flexible deployment of ITS service over one or more radio technologies, or provide harmonization of service discovery across multiple radios of which different receiving devices may have different sets of capabilities.

The local discovery mechanism may enable cloud services to be deployed locally and discovered locally, so that central management of the local services (which may be deployed at different geolocations) does not have to be performed.

The storage medium 504 can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
receiving, by a first wireless device within a first frequency band designated for vehicle-related communications, service information for a vehicle-related service, the service information received from a second wireless device and comprising information of a frequency channel in a second frequency band for communication of data of the vehicle-related service, the second frequency band being outside of the first frequency band, wherein the communication of data of the vehicle-related service has been offloaded to the second frequency band, and the vehicle-related service is provided by a server;
receiving, by the first wireless device from the second wireless device within the first frequency band designated for vehicle-related communications, a token and a Uniform Resource Locator (URL) related to the vehicle-related service on a network;
accessing, by the first wireless device using the frequency channel in the second frequency band indicated by the information of the frequency channel in the second frequency band included in the service information from the second wireless device, the server at the URL received by the first wireless device from the second wireless device; and
as part of the accessing of the server at the URL by the first wireless device, sending, by the first wireless device to the server providing the vehicle-related service, the token for authentication of the first wireless device by the server providing the vehicle-related service.

2. The method of claim 1, wherein a first type of access network that supports the first frequency band is different from a second type of access network that supports the second frequency band.

3. The method of claim 1, wherein the service information further comprises stream characteristic information indicating a stream characteristic of the communication of data of the vehicle-related service, the stream characteristic information indicating whether the communication of data of the vehicle-related service is unidirectional or bidirectional, the method comprising:
receiving, by the first wireless device from the vehicle-related service, unidirectional or bidirectional data according to whether the stream characteristic information indicates a unidirectional or bidirectional communication of data.

4. The method of claim 1, wherein the service information further comprises information indicating a stream characteristic of the communication of data of the vehicle-related service, the information indicating the stream characteristic indicating whether the communication of data of the vehicle-related service is unicast or multicast, the method comprising:
receiving, by the first wireless device from the vehicle-related service, data according to the indicated stream characteristic.

5. The method of claim 1, wherein the service information is included in a Wireless Access in Vehicular Environments Service Advertisement (WSA) message.

6. The method of claim 1, wherein the service information is included in a message prior to association of the first wireless device with the second wireless device.

7. The method of claim 1, wherein the service information is included in a broadcast Public Action Frame.

8. The method of claim 1, wherein the second wireless device is a road side unit (RSU) that performs vehicle-to-infrastructure communications.

9. The method of claim 1, wherein the service information comprises an Internet Protocol (IP) Uniform Resource Identifier (URI) or a Wireless Access in Vehicular Environments Service Advertisement (WSA) URI.

10. The method of claim 1, wherein the service information is signed by a signature to allow confirmation of authenticity of the service information.

11. The method of claim 1, wherein the service information is included in an Access Network Query Protocol (ANQP) message or a Generic Advertisement Service (GAS) message from the second wireless device.

12. The method of claim 1, wherein the token is received by the first wireless device while the first wireless device is in a proximity of and communicating over a local wireless medium with the second wireless device, and wherein an access of the vehicle-related service by the first wireless device occurs using the frequency channel over an access network that is separate from the local wireless medium.

13. The method of claim 12, wherein the token provides an indication that the first wireless device was within a specified geolocation of the second wireless device at a time the first wireless device received the token, and wherein the authentication of the first wireless device by the server providing the vehicle-related service is based on the indication that the first wireless device was within the specified geolocation of the second wireless device at the time the first wireless device received the token.

14. The method of claim 1, wherein the service information contains information for a plurality of vehicle-related services.

15. A first wireless device comprising:
a wireless interface; and
at least one processor coupled to the wireless interface and configured to:
receive, at the first wireless device from a second wireless device within a first frequency band designated for vehicle-related communications, service information for a vehicle-related service, the service information comprising information of a frequency channel in a second frequency band for communication of data of the vehicle-related service, the second frequency band being outside of the first frequency band, wherein the communication of data of the vehicle-related service has been offloaded to the second frequency band, and the vehicle-related service is provided by a server,
receive, at the first wireless device from the second wireless device within the first frequency band designated for vehicle-related communications, a token and a Uniform Resource Locator (URL) related to the vehicle-related service on a network,
access, by the first wireless device using the frequency channel in the second frequency band indicated by the information of the frequency channel in the second frequency band included in the service information from the second wireless device, the server at the URL received by the first wireless device from the second wireless device, and as part of the accessing of the server at the URL by the first wireless device, send, from the first wireless device to the server providing the vehicle-related service, the token for authentication of the first wireless device by the server providing the vehicle-related service.

16. The first wireless device of claim 15, wherein the service information contains information for a plurality of vehicle-related services, and the at least one processor is configured to:

compare the plurality of vehicle-related services to information of one or more vehicle-related services stored at the first wireless device, and identify the vehicle-related service that is to be accessed based on the comparison.

17. The first wireless device of claim 15, wherein the service information indicates a plurality of different access techniques for accessing the vehicle-related service, and the at least one processor is configured to:

select, to use in accessing the vehicle-related service, an access technique from the plurality of different access techniques.

18. The first wireless device of claim 15, wherein the at least one processor is configured to:

confirm an authenticity of the service information based on signing of the service information represented by a signature.

19. The first wireless device of claim 15, wherein the token comprises a universally unique identifier (UUID).

20. A non-transitory machine-readable storage medium comprising instructions that upon execution cause a first wireless device to:

receive, at the first wireless device from a second wireless device within a first frequency band designated for vehicle-related communications, service information for a vehicle-related service, the service information provided by the vehicle-related service and comprising information of a frequency channel in a second frequency band for communication of data of the vehicle-related service, the second frequency band being outside of the first frequency band, wherein the communication of data of the vehicle-related service has been offloaded to the second frequency band, and the vehicle-related service is provided by a server;

receive, at the first wireless device from the second wireless device within the first frequency band designated for vehicle-related communications, a token and a Uniform Resource Locator (URL) related to the vehicle-related service on a network;

access, by the first wireless device using the frequency channel in the second frequency band indicated by the information of the frequency channel in the second frequency band included in the service information from the second wireless device, the server at the URL received by the first wireless device from the second wireless device;

as part of the accessing of the server at the URL by the first wireless device, send, from the first wireless device to the server providing the vehicle-related service, the token for authentication of the first wireless device by the server providing the vehicle-related service; and receive, at the first wireless device from the vehicle-related service after the authentication, data related to the vehicle-related service.

* * * * *